United States Patent [19]

LaCourse et al.

[11] Patent Number: 5,215,563
[45] Date of Patent: Jun. 1, 1993

[54] PROCESS FOR PREPARING A DURABLE GLASS COMPOSITION

[75] Inventors: William C. LaCourse, Alfred, N.Y.;
Steve T. Lin, Fort Wayne, Ind.;
Thirukumar Vethanyagam, Corning, N.Y.

[73] Assignee: Alfred University, Alfred, N.Y.

[21] Appl. No.: 609,169

[22] Filed: Nov. 1, 1990

Related U.S. Application Data

[63] Continuation-in-part of Ser. No. 519,176, May 4, 1990, abandoned.

[51] Int. Cl.$^5$ .................. C03B 37/00; C03C 15/00; C03C 13/00; C03C 3/16
[52] U.S. Cl. ............................ 65/2; 65/30.1; 501/35; 501/45; 428/228; 428/241; 623/11; 623/16; 264/65
[58] Field of Search ............... 501/45, 44, 35; 264/65; 65/30.1, 2; 428/228, 241; 623/11, 16

[56] References Cited

U.S. PATENT DOCUMENTS

| | | | |
|---|---|---|---|
| 3,897,236 | 7/1975 | Roberts | 501/45 |
| 4,182,437 | 1/1980 | Roberts et al. | 501/45 |
| 4,604,097 | 8/1986 | Graves, Jr. et al. | 501/35 |
| 4,735,857 | 4/1988 | Tagai et al. | 501/35 |
| 4,741,752 | 5/1988 | France et al. | 501/35 |
| 4,820,573 | 4/1989 | Tagai et al. | 501/35 |
| 4,847,219 | 7/1989 | Boatner | 501/27 |
| 5,013,323 | 5/1991 | Kobayashi et al. | 501/1 |

Primary Examiner—Mark L. Bell
Assistant Examiner—Michael Marcheschi
Attorney, Agent, or Firm—Howard J. Greenwald

[57] ABSTRACT

A process for preparing an improved durable glass composition is described. In the first step of the process, a glass batch containing from 40 to 80 mole percent of phosphorous and from 3 to 40 mole percent of iron is provided. In the second step of the process, the glass batch is melted under an enriched oxygen atmosphere.

15 Claims, 1 Drawing Sheet

PROCESS FOR PREPARING A DURABLE GLASS COMPOSITION

CROSS-REFERENCE TO RELATED APPLICATION

This is a continuation-in-part of copending patent application 07/519,176, filed on May 4, 1990 now abandoned.

FIELD OF THE INVENTION

A process for preparing a durable, bioabsorbable glass in which a glass batch is melted in the presence of oxygen during glass melting.

BACKGROUND OF THE INVENTION

Phosphate glass compositions are well known to those skilled in the art. Thus, for example, U.S. Pat. No. 4,645,749 of Drake discloses a water soluble phosphate glass composition useful for preparing an analytical solution containing phosphorous pentoxide, calcium oxide, and sodium oxide. When this composition is contacted with pure water, it releases the sodium ion at a rate of from 0.01 to 100 micrograms per square centimeter per hour.

Fibers made from phosphate glass compositions often have poor physical properties. Thus, for example, U.S. Pat. No. 4,604,097 of Graves et al. disclose a spun or drawn fiber consisting primarily of calcium oxide and phosphorous pentoxide which may be used as reinforcement for resorbable polymeric bone plates and artificial ligaments. In column 5 of the patent, the patentees disclose that the average tensile strength of the fibers prepared in the experiment of Example I was only 37,100 pounds per square inch. In column 6 of the patent, it is disclosed that the average tensile strength of the fibers prepared in the experiment of Example 11 was only 57,800 pounds per square inch.

U.S. Pat. No. 4,613,577 of Hideo Tagai et al. discloses a bioabsorbable glass fiber containing calcium phosphate; similar glass fibers are disclosed in Tagai et al.'s U.S. Pat. Nos. 4,735,857 and 4,820,573. Tagai et al. do not disclose the physical properties of their glass fibers and how durable such fibers are. However, there is much evidence in the Tagai et al. patents that at least some of the calcium phosphate glass fibers have poor mechanical properties. Thus, at lines 11–15 of column 4 of U.S. Pat. No. 4,613,577, Tagai et al. disclose that "Even if fibers might be formed from a glass having a molar ratio of Ca/P of not less than 0.6, the fibers become opaque due to devitrification and too weak to be applied for practical use." At columns 4 and 5 of such patent, Tagai et al. teach that it is preferred to coat the fibers of their invention with calcium phosphate. However, at column 5, Tagai also teaches that the pH of the coating solution is critical because, if "... the pH value of the solution is less than 2, the fiber glass mainly composed of calcium phosphate deteriorates so as to have a strength weaker than that required for practical use."

Furthermore, many of the compositions discussed in the Tagai et al. patents cannot be formed into fiber. Thus, e.g., on lines 1–8 of column 4 of the U.S. Pat. No. 4,613,577, Tagai et al. teach that "The fiber glass ... should have a molar ratio of Ca/P of not less than 0.2 and less than 0.6 ... If the molar ratio of Ca/P is less than 0.2, the viscosity of the molten glass becomes so low as to make it difficult to form fibers therefrom. On the contrary, if the molar ratio of Ca/P is not less than 0.6, it becomes hard to melt the glass or the viscosity of the molten mass becomes too high to spin fibers therefrom.

It is an object of this invention to provide fiberizable phosphate glass compositions with superior mechanical properties and chemical durability.

It is another object of this invention to provide bioabsorbable glass fibers with superior mechanical and durability properties.

SUMMARY OF THE INVENTION

In accordance with this invention, there is provided a process for forming bioabsorbable glass. In the first step of this process, a glass batch containing from about 40 to about 80 mole percent of phosphorous compound and from about 3 to about 40 mole percent of iron compound is provided. Thereafter, the glass batch is melted while under an enriched oxygen atmosphere.

BRIEF DESCRIPTION OF THE DRAWING

The present invention will be more fully understood by reference to the following detailed description thereof, when read in conjunction with the attached drawing, wherein like reference numerals refer to like elements, and wherein.

DESCRIPTION OF THE PREFERRED EMBODIMENTS

Figure 1:
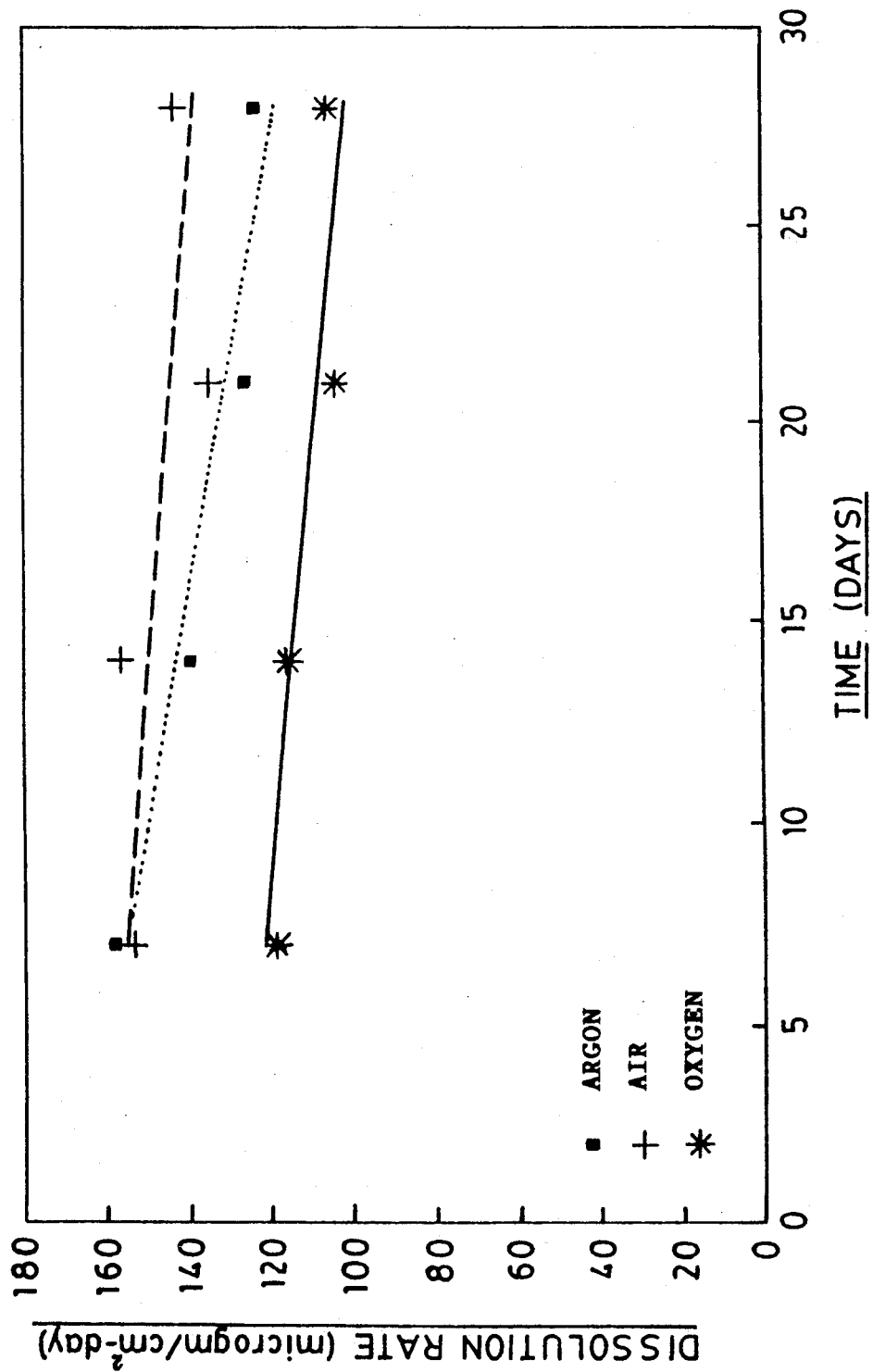
FIG. 1 is a graph showing the durability properties of the glass compositions of some of the examples of this patent application.

In the first step of the preferred process of this invention, the materials comprising the glass batch are charged into a mixer. In general, a sufficient amount of such phosphorous compound is charged so that the resulting glass formed from the batch contains from about 40 to about 80 mole percent of phosphorous pentoxide ($P_2O_5$). Thus, as is known to those skilled in the art, although the custom in the glass art is to refer to the constituents in the form of oxides, the oxides per se need not be used in producing the glass.

A sufficient amount of a suitable phosphorous compound is charged to the mixer so that the batch contains, on an equivalent basis, from about 40 to about 80 mole percent of phosphorous, expressed as phosphorous pentoxide. By way of illustration and not limitation, suitable phosphorous compounds include phosphorous pentoxide, phosphoric acid, phosphoric acid, calcium phosphate, ammonium hydrogen phosphate, and the like. Other metaphosphates and pyrophosphates may also be used. Thus, e.g., synthetic apatite, tricalcium phosphate, and other calcium phosphate compounds having a Ca/P atomic ratio of 1.4–1.75 may also be used. See, e.g., U.S. Pat. No. 4,376,168 of Takami et al., the disclosure of which is hereby incorporated by reference into this specification.

In one preferred embodiment, a sufficient amount of the phosphorous compound is charged to the mixer so that the batch contains, on an equivalent basis, from about 55 to about 75 mole percent of phosphorous pentoxide.

In one embodiment, a portion of the phosphorous material charged to the mixer is replaced by silica.

In addition to the phosphorous compound, a sufficient amount of iron compound is added so that the batch contains, on an equivalent basis, from about 3 to about 40 mole of iron, expressed as percent of $Fe_2O_3$.

Suitable iron compounds include, e.g., ferrous oxide (FeO, also often referred to as iron monoxide), ferric oxide ($Fe_2O_3$, also referred to as ferric trioxide), calcium ferro compounds, and the like.

In one embodiment, the iron compound used is ferric oxide, and some of the ferric oxide is replaced by alumina.

In addition to the phosphorous compound and the iron compound, the batch in the mixer may—but need not be—comprised of from about 5 to about 50 mole percent of at least one compound of a divalent cation selected from the group consisting of compounds of calcium, zinc, magnesium, barium, and mixtures thereof. One may use a mixture of two of such cations such as, e.g., calcium and zinc or calcium and magnesium.

In addition to the phosphorus compound and the iron compound, the batch in the mixer may also comprise from about 5 to about 15 mole percent of an alkali metal compound. Any suitable source of alkali metal cation may be used. Thus, for example, one may use the oxides of sodium, potassium, lithium, and mixtures thereof. Thus, e.g., the carbonate, the nitrate, etc. of the alkali metal cation(s) may also be used. Thus, e.g., one may use sodium phosphate, sodium metaphosphate, potassium oxide, potassium carbonate, sodium carbonate, and the like.

Commercially available reagents may be used in the process of this invention. Thus, e.g., calcium oxide may be used in the form of limestone. Magnesium oxide may be used in the form of dolomite. Soda ash made by the Solvay process may be used. Other alkalis may be introduced into the batch by feldspar, phonolite, or nepheline-syenite. Potassium oxide may be introduced into the glass as potassium carbonate (potash). Barium oxide may be introduced into the glass as barium carbonate, barium sulfate, or barium nitrate. Small amounts of alumina may be introduced into the glass as a subsidiary component of limestone; if a higher alumina content is required, use may be made of aluminum oxide, aluminum hydroxide, feldspar, kaolin, phonolite, etc.

By way of illustration and not limitation, one may use a glass comprised of about 25 mole percent of calcium oxide (CaO), 68 mole percent of phosphorous pentoxide ($P_2O_5$), and 7 mole percent of iron oxide. This is a relatively good fiber-forming composition.

By way of further illustration, one may use a glass comprised of about 25 mole percent of calcium oxide, 65 percent of phosphorous pentoxide, 3 mole percent of alumina, and 7 mole percent of iron oxide. This glass has excellent durability.

By way of further illustration, one may use a glass comprised of about 25 mole percent of calcium oxide, 68 mole percent of phosphorous pentoxide, 2 mole percent of alumina, and 7 mole percent of iron oxide.

By way of yet further illustration, one may use a glass comprised of about 11 mole percent of calcium oxide, 79 mole percent of phosphorous pentoxide, and 10 mole percent of iron oxide.

In one preferred embodiment, the glass contains at least about 55 mole percent of phosphorous pentoxide.

Melting of the glass batch

Once a homogeneous glass batch with the desired composition has been obtained in the mixer, it may be discharged to a glass former, in which it is melted.

As is well known to those skilled in the art, the glass former is comprised of a glass-melting furnace. Any of the glass-melting furnaces known to those skilled in the art may be used. Thus, by way of illustration, one may use a pot furnace, a day tank, a continuous tank furnace, an all-electric furnace, and the like. These furnaces are described on pages 143-155 of J. Hlavac's "The Technology of Glass and Ceramics: An Introduction" (Elsevier Scientific Publishing Company, New York, 1983), the disclosure of which is hereby incorporated by reference into this specification.

The glass former also is comprised of means for forming the glass melt into glass; as is known to those skilled in the art, the glass may be formed either in contact with gaseous atmosphere or by means of metal molds. Any of the glass forming methods and apparatuses known to those skilled in the art may be used. Thus, e.g. one may use the means described on pages 155-160 of the aforementioned J. Hlavac book entitled "The Technology of Glass and Ceramics. . . . " Thus, e.g., one may use the means described in Chapter 7 of George W. McLellan et al.'s "Glass Engineering Handbook," Third Edition (McGraw-Hill Book Company, New York, 1984), the disclosure of which is hereby incorporated by reference into this specification.

In the process of this invention, the glass is melted in an atmosphere which contains at least about 50 volume percent of oxygen. It is preferred that the atmosphere in which glass batch is melted contain at least about 60 volume percent of oxygen. It is more preferred that the atmosphere contain at least about 70 volume percent of oxygen. In an even more preferred embodiment, the atmosphere contains at least about 80 volume percent of oxygen. In one especially preferred embodiment, the atmosphere consists essentially of oxygen.

The temperature used for the glass melting will depend upon the composition of the glass batch being melted. In general, the temperature should be such that the viscosity of the melt is less than about 1,000 poise. In one embodiment, the glass melting temperature is greater than about 1,100 degrees Centigrade. In one embodiment, the glass melting temperature is greater than about 1,200 degrees Centigrade. In one embodiment, the glass melting temperature is greater than about 1,275 degrees Centigrade.

Fiber may be made from the glass melt produced by the process of this invention by means well known to those skilled in the art. Thus, one may prepare continuous fibers with diameters from about 3 to about 500 microns. It is preferred that the continuous fibers have diameters of from about 3 to about 50 microns. In one embodiment, the diameter of the continuous fibers is from about 10 to about 30 microns.

Alternatively, one may prepare staple fibers, blown fibers, microfibers, and the like.

Fiberization processes are well known to those skilled in the art. Thus, as is disclosed in J. G. Mohr et al.'s "Fiber Glass," (Van Nostrand Reinhold Company, New York, 1978), the disclosure of which is hereby incorporated by reference into this specification, one may make fiber from applicants' glass compositions by a "Mineral Wool" process (see pages 8-9), by a steam-blown process (see pages 9-10), by a flame attenuation process (see pages 10-11), by a spinning process (see pages 10-11), by a rotary process (see pages 12-14), etc.

In one preferred embodiment, the glass is made into continuous filament. As is known to those skilled in the art, one may use the marble melt process, the direct melt process, or the Strickland process for making continuous filament; see, e.g., pages 190-200 of the Mohr et al. book.

Another reference which discloses means for preparing continuous glass fibers is K.L. Lowenstein's "The Manufacturing Technology of Continuous Glass Fibres," Elsevier Scientific Publishing Company (New York, 1973), the disclosure of which is hereby incorporated by reference into this specification.

Both the glass made by the process of this invention, and the fiber made by the process of this invention, have improved durability properties. The durability of the compositions of the invention may be evaluated in a constant temperature bath. The preferred testing apparatus is a Fisher Versa-Bath S Shaker Bath, model number 236, which is described on pages 100-101 of the "Fisher 88" catalog (Fisher Scientific, 711 Forbes Avenue, Pittsburgh, Penn.), the disclosure of which is hereby incorporated by reference into this specification. In determining the durability of the compositions of this invention, this bath is maintained at a temperature of 37 degrees centigrade and is operated at a shaking speed of 60 strokes per minute, each stroke being 2.0 inches long.

The fibers made by the process of this invention have an improved average tensile strength. The average tensile strength of a glass fiber may be determined in accordance with a conventional procedure on a laboratory tensile testing unit; thus the tensile test units sold by Instron Corporation of 100 Royall Street, Canton, Mass. may be used to test the fiber. In the test, individual samples of 10, 20 and 30 millimeter gage lengths are used; and each of them are attached to a paper cutout using a drop of standard household glue (Elmer's Glue All, Borden Inc., Columbus, Ohio) at the points of contact of the fiber with the paper. Testing of the samples is done immediately after preparation and drying of the glue; the samples are loaded at a constant strain rate of 10 millimeters per minute. The average of the tensile strength of twenty fiber samples is the average tensile strength for the fiber.

Fibers made by the process of this invention have an improved Young's Modulus. The Young's modulus and the tensile strength of the fiber may be determined in accordance with A.S.T.M. Standard Test D3379-75, entitled "Standard Test Method for Tensile Strength and Young's Modulus for High Modulus Single Filament Materials," the disclosure of which is hereby incorporated by reference into this specification. The moduli of twenty fiber samples is determined, an average is calculated, and it is reported as an average Young's modulus.

The following examples are presented to illustrate the claimed invention but are not to be deemed limitative thereof. Unless otherwise specified, all parts are by weight and all temperatures are in degrees Centigrade.

EXAMPLE 1

Eleven parts of calcium oxide, 79 parts of phosphorous pentoxide, and 10 parts of ferric oxide were ground in a mortar and pestle until a uniform glass batch was obtained. The mixed batch was then premelted in an alumina crucible at 600 degrees Centigrade. After the premelting, the crucible was transferred to a furnace at 1,300 degrees Centigrade where it was subjected to an atmosphere consisting of oxygen and said temperature of about 1,300 degrees Centigrade for about 1 hour. The crucible was then removed from the furnace, and the glass specimen was cast in a graphite mold maintained at 700 degrees Centigrade.

The dissolution rate of the glass specimen was determined gravimetrically. The glass specimen (which was about 1 inch long and about 0.25 inch in diameter) was immersed in 25 milliliters of a phosphate buffered solution with a pH of 7.4, and the glass specimen/phosphate buffered solution was kept at 37 degrees Centigrade in a shaker bath.

The dissolution rate of the glass specimen was obtained by removing the glass sample from the bath at a specified time, weighing the glass sample, and dividing the weight loss over the surface area and the immersion time.

At a time of 10,000 minutes, the glass of this example had a dissolution rate of about $8.2 \times 10^{-8}$ grams per square centimeter per minute.

EXAMPLES 2-3

The procedure of Example 1 was substantially followed, with the exception that the oxygen atmosphere of Example 1 was replaced either with an air atmosphere (Example 2) or an argon atmosphere (Example 3). The glass of Example 2 had a dissolution rate of about $10.7 \times 10^{-8}$ grams per square centimeter per minute. The glass of Example 3 had a dissolution rate of about $11.0 \times 10^{-8}$ grams per square centimeter per minute.

The dissolution rates for the experiments of Examples 1, 2, and 3 may be expressed in terms of micrograms per square centimeter per day. The dissolution rate of the glass of Example 1 (oxygen atmosphere) was 118.4 micrograms per square centimeter per day. The dissolution rate of the glass of Example 2 (air atmosphere) was 153.0 micrograms per square centimeter per day. The dissolution rate of the glass of Example 3 (argon atmosphere) was 157.5 micrograms per square centimeter per day.

EXAMPLES 4-19

The procedure of Examples 1-3 was substantially followed, with the exception that the glass samples were maintained in the phosphate buffer solution for different times before their durabilities were tested. The results of these experiments are shown graphically in FIG. 1.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

One may make fibers by the process of this invention which have a maximum dimension of from about 3 to about 100 microns and, preferably, from about 10 to about 30 microns. The fiber may have any cross-sectional shape, but it is preferred that it be circular.

One may prepare a composite comprised of the fiber of this invention and a polymeric material. The polymeric material may be a bioabsorbable polymer. See, e.g., U.S. Pat. Nos. 4,329,743 and 4,411,027 of Alexander (polylactic acid), U.S. Pat. Nos. 4,141,087, 4,140,678, and 4,052,988, each of which is hereby incorporated by reference into this specification.

One may form a composite material with the fiber of this invention and epoxy resin. As is known to those skilled in the art, epoxy resins are a class of synthetic resins characterized by having in the molecule a highly reactive oxirane ring of triangular configuration consisting of an oxygen atom bonded to two adjoining and bonded carbon atoms. See, e.g., pages 287–289 of G. S. Brady et al.'s "Materials Handbook" (McGraw-Hill Book Company, New York, 1986), the disclosure of which is hereby incorporated by reference into this specification.

What is claimed is:

1. A process for preparing a durable, bioabsorbable fiber, comprising the steps of:
   (a) providing a glass batch comprised of at least about 55 mole percent of phosphorous (expressed as phosphorous pentoxide), from about 3 to about 40 mole percent of iron (expressed as ferric oxide), from about 5 to about 50 mole percent of a compound of a divalent cation selected from the group consisting of compounds of calcium, zinc, magnesium, and mixtures thereof, and from about 0 to about 15 mole percent of an alkali metal compound;
   (b) heating said glass batch to a temperature sufficient to cause said glass batch to form a melt while simultaneously contacting said glass batch with an atmosphere comprised of at least about 50 volume percent of oxygen, thereby producing a composition which has been contacted with an oxygen-rich atmosphere; and
   (c) forming a fiber from said composition which has been contacted with an oxygen-rich atmospere.

2. The process as recited in claim 1, wherein said atmosphere consists essentially of oxygen.

3. The process as recited in claim 2, wherein said divalent cation is calcium.

4. The process as recited in claim 1, wherein said glass batch is melted at a temperature in excess of about 1,200 degrees Centigrade.

5. The process as recited in claim 1, wherein said glass batch is comprised of from about 55 to about 75 mole percent of phosphorous compound (expressed as phosphorous pentoxide).

6. The process as recited in claim 1, wherein a portion of the phosphorous is replaced by silica.

7. The process as recited in claim 1, wherein a portion of the iron is replaced by alumina.

8. The process as recited in claim 1, wherein said glass batch is additionally comprised of from about 5 to about 14 mole percent of alkali metal compound.

9. The process as recited in claim 8, wherein said alkali metal is selected from the group consisting of sodium, potassium, lithium, and mixtures thereof.

10. The process as recited in claim 8, wherein said alkali metal compound is selected from the group consisting of sodium oxide, potassium oxide, lithium oxide, and mixtures thereof.

11. The process as recited in claim 9, wherein said alkali metal compound is selected from the group consisting of sodium oxide, potassium oxide, lithium oxide, and mixtures thereof.

12. The process as recited in claim 9, wherein said alkali metal compound is selected from the group consisting of sodium carbonate, potassium carbonate, lithium carbonate, and mixtures thereof.

13. The process as recited in claim 9, wherein said alkali metal compound is selected from the group consisting of sodium nitrate, potassium nitrate, lithium nitrate, and mixtures thereof.

14. The process as recited in claim 1, wherein said glass batch is comprised of about 79 mole percent of phosphorous pentoxide, 11 mole percent of calcium oxide, and 10 mole percent of ferric oxide.

15. The process as recited in claim 14, wherein said glass is melted at a temperature of about 1,300 degrees Centigrade while being contacted with an atmosphere consisting essentially of oxygen.

* * * * *